(12) United States Patent
Anabuki et al.

(10) Patent No.: US 6,441,913 B1
(45) Date of Patent: Aug. 27, 2002

(54) IMAGE PROCESSING APPARATUS AND IMAGE PROCESSING METHOD

(75) Inventors: Tetsushi Anabuki; Junichi Matsunoshita; Yoshinaru Hibi; Hiroyuki Kawano, all of Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/166,933

(22) Filed: Oct. 6, 1998

(30) Foreign Application Priority Data

Oct. 24, 1997 (JP) ............................................. 9-291981

(51) Int. Cl.⁷ .............................................. G06K 15/00
(52) U.S. Cl. ..................................... 358/1.12; 358/521
(58) Field of Search ................................. 358/500, 515, 358/521, 532, 461, 1.12, 1.2, 1.9

(56) References Cited

U.S. PATENT DOCUMENTS

| | | | | |
|---|---|---|---|---|
| 5,038,218 A | * | 8/1991 | Matsumoto | 358/296 |
| 5,504,842 A | * | 4/1996 | Gentile | 395/114 |
| 5,715,382 A | * | 2/1998 | Herregods et al. | 395/117 |
| 6,081,343 A | * | 6/2000 | Terashita | 358/1.9 |
| 6,134,025 A | * | 10/2000 | Takeuchi et al. | 358/456 |
| 6,215,904 B1 | * | 4/2001 | Lavallee | 382/234 |
| 6,219,454 B1 | * | 4/2001 | Kawano et al. | 382/232 |
| 2001/0017593 A1 | * | 8/2001 | Saunders et al. | 341/50 |

FOREIGN PATENT DOCUMENTS

| | | | | |
|---|---|---|---|---|
| JP | 64-080166 | 3/1989 | | H04N/1/46 |
| JP | 05-342314 | 12/1993 | | H04N/1/387 |
| JP | 63-085984 | 4/1998 | | H04N/1/387 |

OTHER PUBLICATIONS

"Draft Recommendation T.44, Mixed Raster Content (MRC)" International Telecommunication Union, Telecommunication Standardization Sector, Study Period 1997–2000 (COM 8–21–E May 1997), Study Group 8–Contribution 21.

* cited by examiner

Primary Examiner—Jerome Grant, II
(74) Attorney, Agent, or Firm—Oliff & Berridge, PLC

(57) ABSTRACT

Image data combined of a first piece of and a second piece of image data and selection data to selectively designate one of the first piece or the second piece of image data is input to an input portion 1. Those data are expanded by an expanding portion 4. A first image-structure recognizing portion 2 (second image-structure recognizing portion 3) recognizes the image structure of the first (second) piece of image data. A first image-structure converting portion 5 (second image-structure converting portion 6) converts the recognized image structure of the first (second) piece of image data to the image structure of an output device 9. Those image data and the selection data are expanded. A combining portion 7 combines the first piece and the second piece of image data having the same image structure as of the output device while successively selecting the first piece or the second piece of image data on a basis of the selection data, and outputs the combined image data to the output device 9. The output image data has the same image structure as of the output device 9. An image or picture reproduced by the output device 9 is high in quality.

12 Claims, 13 Drawing Sheets

IMAGE PROCESSING APPARATUS AND IMAGE PROCESSING METHOD

BACKGROUND OF THE INVENTION

The present invention relates to an image processing apparatus which receives input image data in the form of separated data, combines those data, and outputs the combined one. Further, the present invention also relates to an image processing method. Besides, the present invention may be also applied to color facsimile machines, or to transmission/reception of images on the Internet.

The facsimile communication through public lines and the image or visual communication through the networks of public lines and LANs are widely used at present. Various types of machines for transmitting and receiving image data are presented, for example, facsimile machines, personal computers, multi-function digital copying machines, and network printers. The market and technical progress have rapidly replaced those old machines handling only monochromatic or black/white images with the machines capable of handling color images. In particular color facsimile machines and color printers takes a major market share. The network system may interconnect different types of machines of different resolutions or different color spaces, e.g., color copying machines and monochrome copying machines.

In the image data communication between the machines of different image structures, an original image input to the machine is usually handled as one plane image. The sender side judges the type of original document, selects the process most appropriate to the judged original, applies the appropriate process to the plane image over its entire image, and sends the processed image data to the receiver side. If an original image, i.e., an image on an original document, is represented by image data of one attribute, viz., it consists of only characters or photograph, no problem arises in handling the original image as a single plane image. However, problem arises if the original image has two or larger number of attributes, for example, the original image contains characters and photograph. To compress the image data containing character or textual data and pictorial data, the same data compression method is applied to both the textual and pictorial image data. In this case, in some type of data compression method, a data compression ratio of the textual image data is different from that of the pictorial image data, and this results in deterioration of the image quality of the textual or pictorial image data.

The resolution, the color space, and the number of gradation levels of the image data, which define the image structure of the image data, are sometimes converted before the transmission of the image data in order to reduce the amount of data to be transmitted. Also in this case, the image data is entirely processed by the same image-structure conversion process. Where it is required that a part of the image data is transmitted in high image quality, it is necessary to transmit the whole image data in high image quality. This results in increase of the amount of the image data transmitted. Where it is required that the image data is transmitted in a real time fashion or at high speed, the image data must be transmitted at low resolution. In this case, the image quality is inevitably deteriorated.

A target image structure to which the image structure of the input image data is converted is determined in the sender side. In the network image communication, the target image structure determined in the sender side is not always coincident with the image structure in the receiver side. For example, the resolution of the input device in the sender side is sometimes different from that of the output device in the receiver side. Other factors defining the image structure, such as the color space, the number of gradation levels, and the screen structure, are also different between the sender side and the receiver side frequently. To transmit the image data whose image structure is different from that in the receiver side, the image structure of the image data in the sender side must be conformed to that of the output device.

SUMMARY OF THE INVENTION

Accordingly, an object of the present invention is to provide an image processing apparatus which provides a high speed transmission of image data, exactly reproduces an original image of high quality, and outputs the image data whose image structure is conformed to the image structure of the output device.

Another object of the present invention is to provide an image-structure converting method which allows the image processing apparatus having the above useful functions to operate.

In the present invention, input image data is received in the form of at least three separated data, a first piece of image data, a second piece of image data, and selection data to selectively specify the first piece or the second piece of image data, and the first piece and the second piece of image data are combined and then output. The first piece and the second piece of image data, and the selection data are subjected to the image-structure conversion process, e.g., resolution conversion process and color-space conversion process, and the compression process, which are selected in consideration with their data characteristics and the best for those separated data. For the data not requiring high resolution, its resolution is converted into a low resolution. For the data requiring high resolution, the data is processed while at high resolution. Thus, the separated data having different image structures are received, and an original image may be reconstructed with the separated image data received, whereby the reduction of data amount and reproduction of the original image of high quality are realized. Further, use of the separated image data provides a high speed image data transmission.

The image structures of the first piece and the second piece of image data and the selection data are determined when the image data is generated. The characteristics of those data and the resolution of the input device also determine the image structures. This necessitates correct combining of the separated image data irrespective of their image structures. The same thing is true also for a case where the image data, while being separated, are stored in the image data base, for example, and the image data is referred to. The fact that a quality output image or picture cannot be secured unless the image structures of the input image data are conformed to the image structure of the output device, is also true.

The present invention handles the first piece and the second piece of image data and the selection data to selectively specify the first piece or the second piece of image data, which make up input image data, in the following manner: those separated data are received; the image structures of the separated data are conformed into the image structure of an output device; then those image data are combined; and the combined image data is output.

Thus, the invention reproduces an original image or picture of high quality irrespective of the image structures of the input image data since the separated image data are combined after the image structures of the separated data are conformed to the that of the output device.

DETAILED DESCRIPTION OF THE PREFERRED EMBODIMENTS

<First Embodiment>

Figure 1:
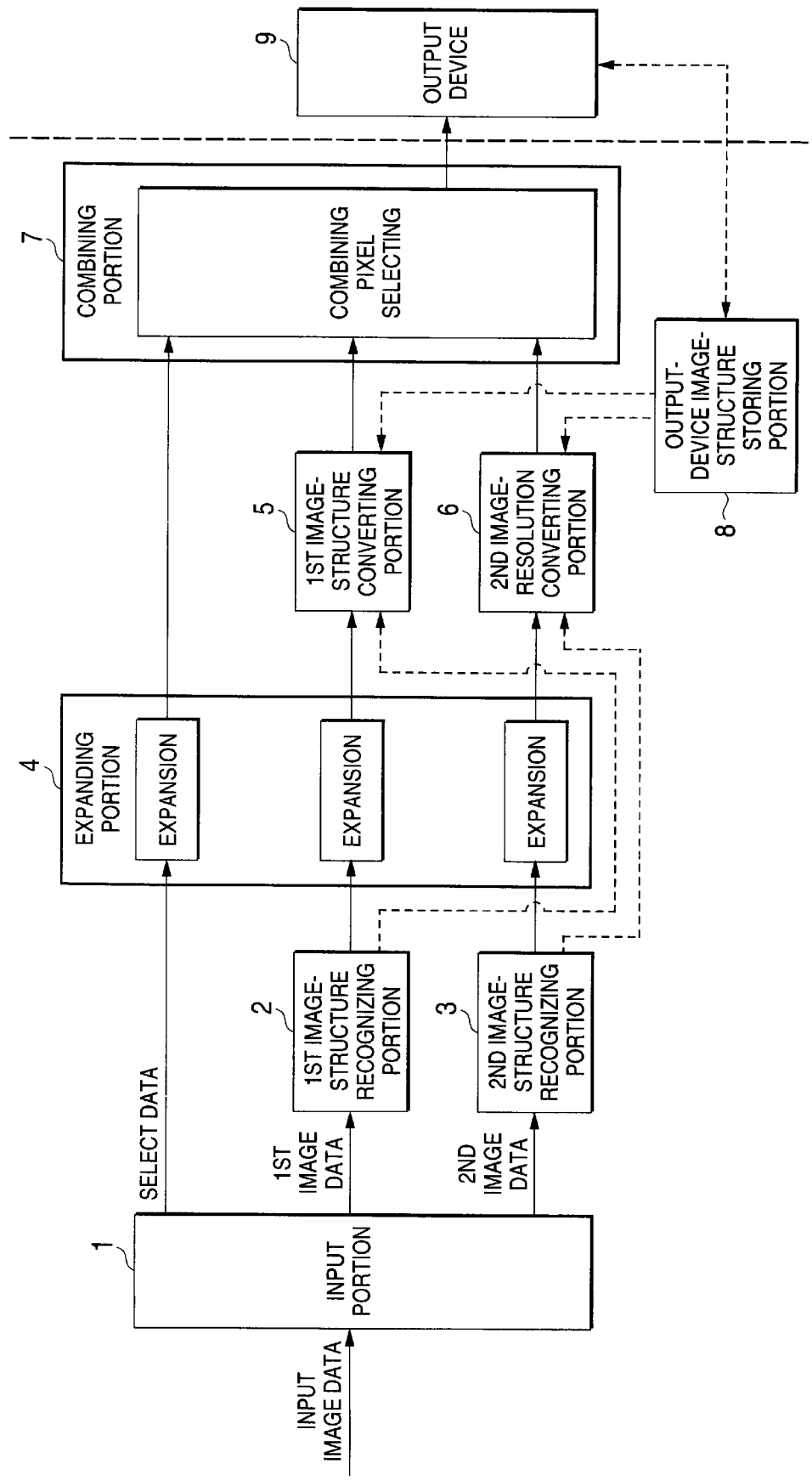
FIG. 1 is a block diagram showing an image processing apparatus which is a first embodiment of the present invention.

FIG. 1 is a block diagram showing an image processing apparatus which is a first embodiment of the present invention. In the figure, reference numeral 1 is an input portion; 2 is a first image-structure recognizing portion; 3 is a second image-structure recognizing portion; 4 is an expanding portion; 5 is a first image-structure converting portion; 6 is a second image-structure converting portion; 7 is a combining portion; 8 is an output-device image-structure storing portion; and 9 is an output device. The image processing apparatus of the first embodiment receives a first piece and a second piece of image data; converts the image structures of those input image data into the image structure of the output device; combines those image data by use of a selection signal, which is received together with the input image data; and outputs combination signal from the output device. In the description to be given hereunder, the term "image structure" indicates a data structure representation of an original image, specified by the fundamental attributes of the original image, such as resolution, color space and gradation level.

The input portion 1 receives image data from an external device. The input image data is obtained through a communication cable of a network or a facsimile machine or read out of an external storage device. The input image data, as will be described later, is separated into a first piece of image data, a second piece of image data, and selection data for selectively specify the first piece or the second piece of image data, and the image structures of those separated data are converted into the image structure adapted for those data.

The first image-structure recognizing portion 2 recognizes the image structure of the first piece of image data. The second image-structure recognizing portion 3 recognizes the image structure of the second image data. The expanding portion 4 expands the input image data, if it is compressed, into original image data. The first image-structure converting portion 5 converts the image structure of the first piece of image data into the image structure of the output device 9. The second image-structure converting portion 6 converts the image structure of the second image data into the image structure of the output device 9. The combining portion 7 combines the first piece and the second piece of image data having the same image structure on a basis of the selection data. The output-device image-structure storing portion 8 stores the image structure of the output device 9.

The output device 9 outputs of the combined image data. The output device 9 may be a printer or a display. The combined image data may be stored into a storage device, e.g., a disc, or sent to another device via a network or a communication cable.

Figure 2:
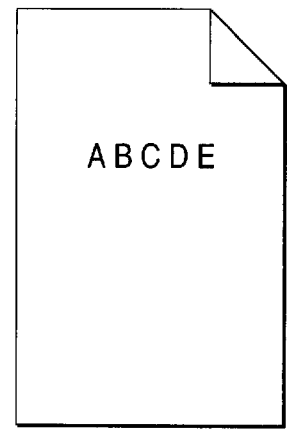
FIG. 2 is a specific example of image data input to the image processing apparatus of the first embodiment.
Figure 2:
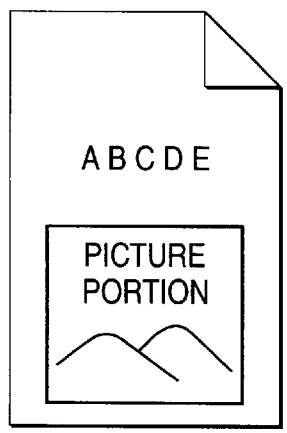
Figure 2:
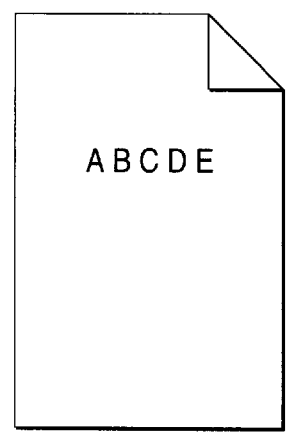
Figure 2:
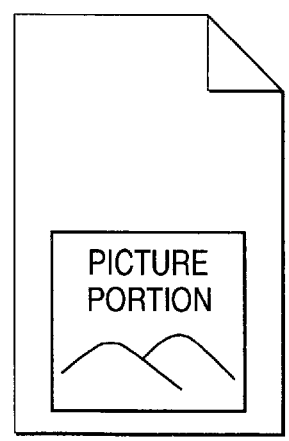

A specific example of image data input to the image processing apparatus under discussion is illustrated in FIG. 2. An image shown in (A) of FIG. 2 consists of "ABCDE" and a picture enclosed by a square. The image data is separated into character data "ABCDE" ((C) of FIG. 2) and pictorial data of the picture ((D) of FIG. 2). The selection data indicates which of the character data or the pictorial data is to be selected for combination of those image data. In this instance, the selection data selects the character data on only the character portion, particularly only the black painted portion forming the line segments of characters. In another case, it selects the pictorial data. For ease of illustration, the character data is illustrated in the form of black painted pixels.

In the instance of FIG. 2, the selection data of (A) of FIG. 2 and the character data of (B) of FIG. 2 look to be the same. Actually, the selection data of (A) of FIG. 2 needs only to be information to discriminate between the character data and the pictorial data for its selection, and in this instance it is constructed with binary data to discriminate between the character data and the pictorial data. The character data of (C) of FIG. 2 further contains color information if the characters are colored.

In the separated character data, the pixels corresponding to the pictorial data, for example, an image region corresponding to the pictorial data in the character data of (C) of FIG. 2, may be expressed in white data, for example. Similarly, in the separated image data, the pixels corresponding to the character data, for example, an image region of "ABCDE" of the pictorial data of (D) of FIG. 2 may be expressed in white data, for example.

The separation of the image data into the character data and the pictorial data produces the following advantages. It is possible to apply to the character data an image structure conversion process, e.g., resolution conversion and color conversion, suitable for the character image, and apply to the pictorial data another image structure conversion process suitable for the pictorial image, e.g., photograph image. This fact implies that the amount of data handled is reduced, a data compression ratio is increased, and further the image data is transferred or stored with little degradation of image quality.

In the above instance, the image data is separated into two types of image data, character data and pictorial data. If required, the pictorial data may be separated into a further number of data types, for example, photograph data and CG (computer graphic) data. In this case, the image data is separated into four different types of image data; character data, photograph data, CG data, and selection data. The image data may be separated into three different types of data; character data, character color data and pictorial data. In this case, the selection data contains edge information, and hence it is treated as character data. In a case where the character is colored in one specific color, e.g., black, the character data may be simplified by use of given data. Thus, it should be understood that in the present invention, there is no limit in the number of separated data and the data construction.

In this instance, for the selection data, it is desirable that the resolution is as high as possible in order to secure clear contours of characters and line drawings. In a case where the selection data is used only for discriminating between an image region containing characters and line drawings and another image region containing the picture, the selection data may be provided for each image region containing several pixels or a given image region.

The image data input to the input portion 1 is such that the image structures of the character data, pictorial data and selection data as shown in FIGS. 2(B) to 2(D) are converted into the image structures suitable for those data, and are arranged into a predetermined image format. In this embodiment, the first piece of image data and the second piece of image data may correspond to the character data or the pictorial data as desired.

There is the possibility that the image data input to the input portion 1 have been converted in their image structure to reduce the amount of data as described above. In a case where image communication devices of different image structure specified by resolution, color space, the number of gradation levels, and others are interconnected, the image structures of the data to be transmitted are determined in the transmission side, and are different for each image data and each data, and also with the performances (e.g., resolution, the number of gradation levels, and color space of the input device). The reception side needs to be capable of normally combining and reconstructing the received image data irrespective of the image structures of the image data. The same thing is true not only for the case of the communication of the image data but also for the case where the image data is retrieved from a data base and is reproduced.

In a case where the image structures of the separated data, in particular of the first piece and the second piece of image data, are different from each other, the combining portion 7 cannot correctly combine those separated data through its simple combining. To cope with this, the first embodiment processes the first piece and the second piece of image data for their image structure conversion before their combining process. To merely secure a normal combining process, it is only needed to coincide the image structure of the first piece of image data with that of the second image data. In this embodiment, those data are finally output to the output device. Because of this, the image structures of the first piece and the second piece of image data are converted to the image structure of the output device.

To convert the image structures of the first piece and the second piece of image data, it is necessary to recognize the image structures of those image data. As already referred to, the image data input to the input portion 1 is such that the image structures of the character data, pictorial data and selection data are converted into the image structures suitable for those data, and are arranged into a predetermined image format. A header storing information on the image structures of the respective data is attached to the image format. The first and the second image-structure recognizing portions 2 and 3 recognize the image structures of the first piece and the second piece of image data by referring to the header.

Figure 3A:
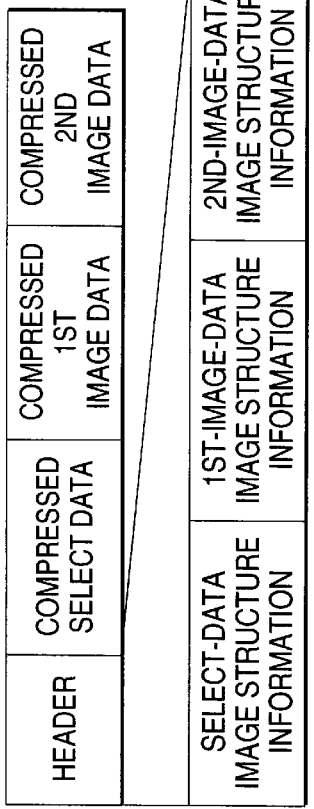
FIGS. 3A to 3C are explanatory diagram showing some image data formats.
Figure 3B:
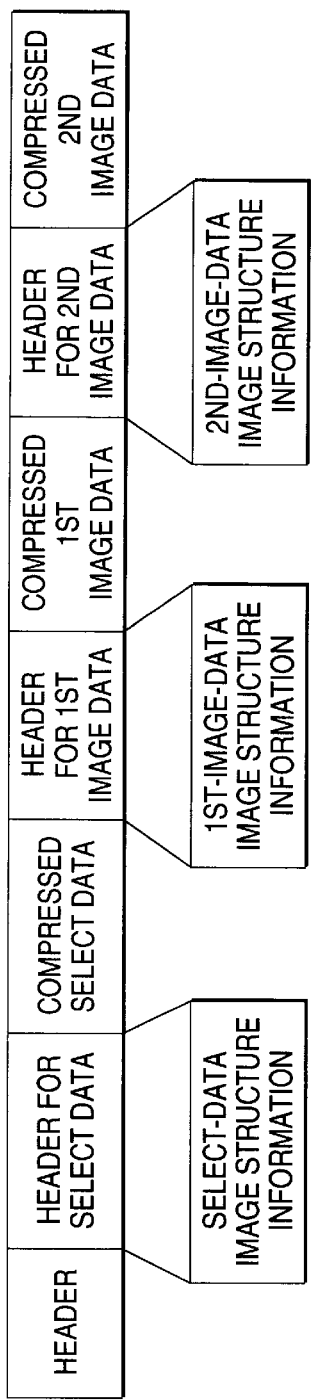
Figure 3C:
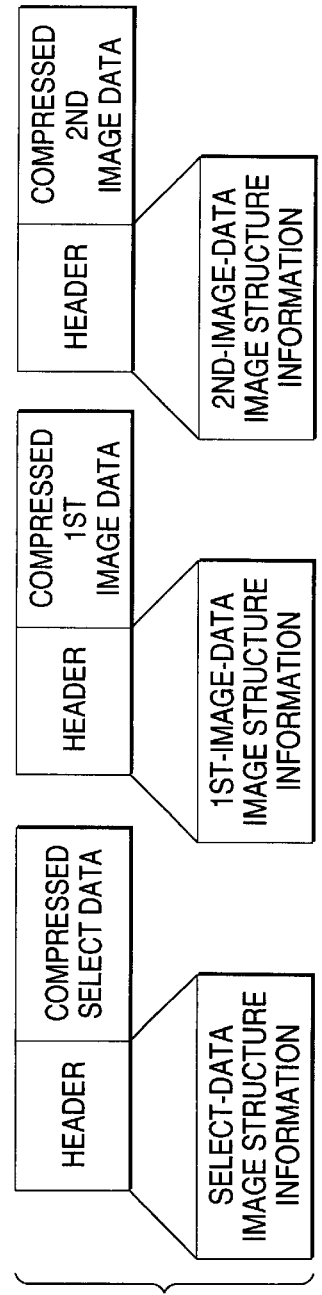

FIGS. 3A to 3C are explanatory diagram showing some image data formats. As shown in FIG. 3A, the header is followed by the three compressed data of the selection data, the first piece of image data and the second piece of image data. The image structure information of the respective data are placed in the header.

In an image data format shown in FIG. 3B, a general header is followed by a combination of a header for selection data and the compressed selection data (located in this order), a combination of a header for first piece of image data and the compressed first piece of image data, and a combination of a header for second image data and the compressed second image data. The image structure information of those data are placed in the headers associated with those data, respectively.

In an image data format shown in FIG. 3C, headers are attached to the compressed data, respectively. Also in this format, the image structure information of those data are placed in the headers associated those data, respectively.

The image data arranged in any of the image data formats shown in FIGS. 3A to 3C is input to the input portion 1, and the first and the second image-structure recognizing portions 2 and 3 refer to the header or headers attached to the first piece and the second piece of image data, and recognize the image structures of those image data.

Figure 4:
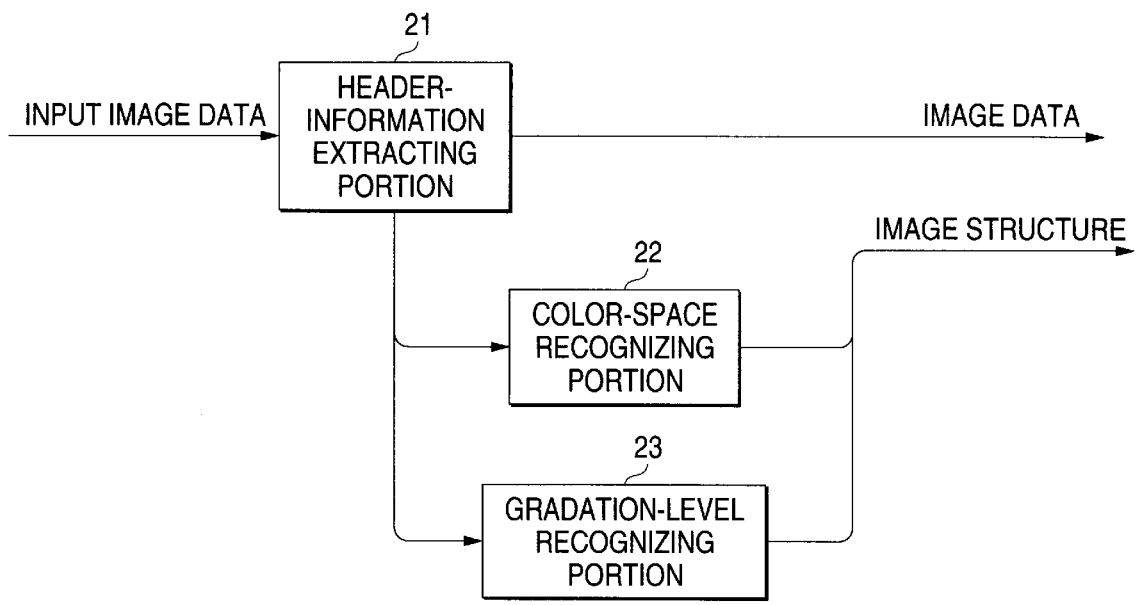
FIG. 4 is a block diagram showing a specific configuration of each of the first and the second image-structure recognizing portions used in the image processing apparatus which is the first embodiment of the invention.

FIG. 4 is a block diagram showing a specific configuration of each of the first and the second image-structure recognizing portions 2 and 3 used in the image processing apparatus which is the first embodiment of the invention. In the figure, reference numeral 21 is a header-information extracting portion; 22 is a color-space recognizing portion; and 23 is a gradation-level recognizing portion. Here, the color space and the number of gradation levels are used for the factors of the image structure.

The header-information extracting portion 21 separates input image data into header information and the first piece or the second piece of image data, and sends the header information to the color-space recognizing portion 22 and the gradation-level recognizing portion 23. The same sends the first piece or the second piece of image data to the expanding portion 4. The color-space recognizing portion 22 processes the header information to recognize color space information. The gradation-level recognizing portion 23 processes the header information to recognize gradation information. The results of the recognition by the color-space recognizing portion 22 and the gradation-level recognizing portion 23 in the first image-structure recognizing portion 2 are sent to the first image-structure converting portion 5. The results of the recognition by the color-space recognizing portion 22 and the gradation-level recognizing portion 23 in the second image-structure recognizing portion 3 are sent to the second image-structure converting portion 6.

Figure 5:
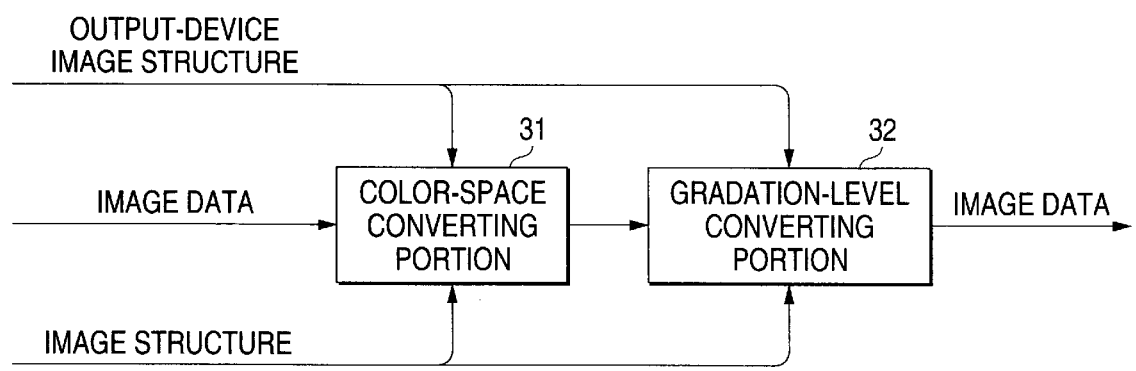
FIG. 5 is a block diagram showing a specific configuration of the first and the second image-structure converting portions in the image processing apparatus of the first embodiment.

FIG. 5 is a block diagram showing a specific configuration of the first and the second image-structure converting portions 5 and 6 in the image processing apparatus under discussion. In the figure, reference numeral 31 is a color-space converting portion and 32 is a gradation-level converting portion. As shown in FIG. 4, the recognition results of color space information and gradation information are output from the first and the second image-structure recognizing portions 2 and 3. The first and the second image-structure converting portions 5 land 6 convert the image structures of the first piece and the second piece of image data on the basis of the recognition results.

The color-space converting portion 31 receives the color space information from the gradation-level recognizing portion 23 and the color space information of the output device from the output-device image-structure storing portion 8, and converts the color space of the image data expanded by the expanding portion 4 into the color space of the output device. The gradation-level converting portion 32 receives the gradation information from the gradation-level recognizing portion 23 and the gradation information of the output device from the output-device image-structure storing portion 8, and converts the number of gradation levels of the color-space converted image data to the number of gradation levels of the output device.

While the gradation-level converting portion 32 follows the color-space converting portion 31 in the illustrated instance, the color-space converting portion 31 may follow the gradation-level converting portion 32. The conversion processes of the color-space converting portion 31 and the gradation-level converting portion 32 in the first image-structure converting portion 5 may be different from those in the second image-structure converting portion 6, respectively. The target image structure of the image structure conversion processes may be different from the present one, i.e., the image structure of the output device. The processes, e.g., a screen process, which are essential to the output device, may be carried out for each data.

Figure 6:
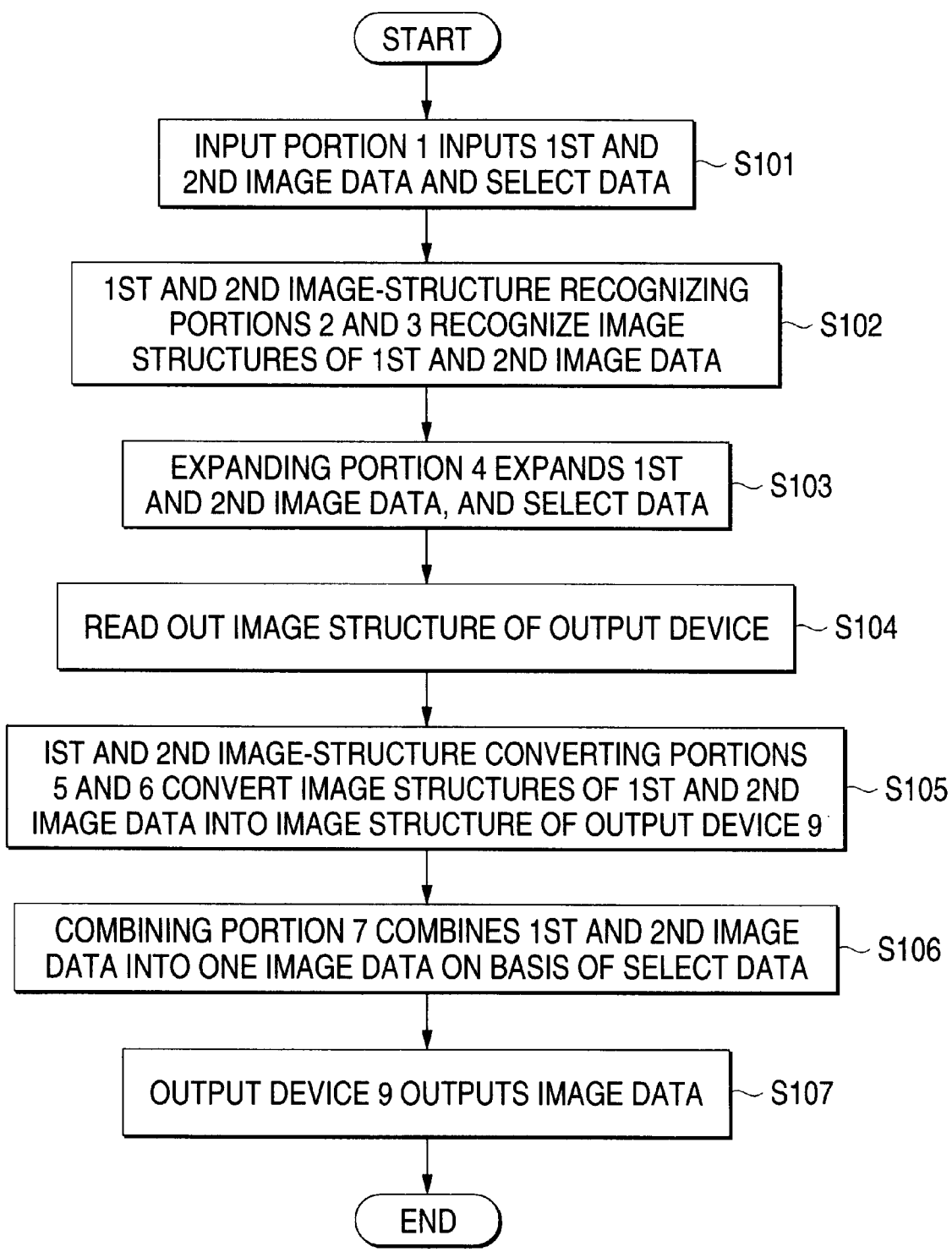
FIG. 6 is a flow chart showing an operation of the image processing apparatus of the first embodiment.

FIG. 6 is a flow chart showing an operation of the image processing apparatus thus constructed. In a step S101, a first piece and a second piece of image data and selection data are input to the input portion 1. In a step S102, the first image-structure recognizing portion 2 recognizes the image structure, e.g., color space and the number of gradation levels, of the first piece of image data received. And the second image-structure recognizing portion 3 recognizes the image structure of the second image data. In recognizing the image structure of the image data, each image-structure recognizing portion refers to the header and extracts the image-structure information of the received image data in a case where the image data has such a data structure with a header containing information about the image structure. If the information on the image structure is not present, the image-structure information may be extracted from the whole image data or preset values may be used for the image-structure information. Where the first and the second image-structure recognizing portions 2 and 3 are each arranged as shown in FIG. 4, the header-information extracting portion 21 extracts the header from the image data; the color-space recognizing portion 22 extracts a color space of the image data; and the gradation-level recognizing portion 23 recognizes the number of gradation levels.

Where the image data is compressed, the expanding portion 4 expands the first piece and the second piece of image data, and the selection data in a step S103.

In a step S104, the first and the second image-structure converting portions 5 and 6 read each the image structure of the output device 9 from the output-device image-structure storing portion 8. The information about the image structure may be set in advance by an operator. Alternatively, the image processing apparatus inquires of the output device its image structure, and stores the resultant image structure into the output-device image-structure storing portion 8. In another alternative, preset information may be stored in advance.

In a step S105, the first image-structure converting portion 5 converts the image structure, e.g., color space and gradation level, of the first piece of image data, which was recognized by the first image-structure recognizing portion 2 into the image structure of the output device 9 which was read out of the output-device image-structure storing portion 8. Similarly, the second image-structure converting portion 6 converts the image structure of the second image data into the image structure of the output device. Where the first and the second image-structure converting portions 5 and 6 are arranged as shown in FIG. 5, the color-space converting portion 31 converts the color space of each of the first piece and the second piece of image data into the color space of the output device 9, for example, an RGB color space for the CRT display (as output device), and a CMYK or CMY color space for the printer. A multi-dimensional lookup table may be used for the color space conversion. If the lookup tables are provided for all the input values, a number of the lookup tables need to be used. To avoid this, the input values are sampled at proper intervals and the lookup tables are formed for those samples input values. The input values stored in the tables are obtained in a proper interpolation manner. A cubic interpolation is preferable for the interpolation to find the input values not found in the tables. A matrix calculation or a one-dimensional lookup table may be used for the color-space converting method. Any other interpolation than the cubic interpolation may be used as a matter of course. For the conversion of the number of gradation levels, the gradation-level recognizing portion 23 operates to convert the number of gradation levels of each of the first piece and the second piece of images to the number of gradation levels of the output device 9. A one-dimensional lookup table may be used for this conversion. A bit-shift method or a multiplication/division method may be used in place of the one-dimensional lookup table.

In a step S106, the combining portion 7 combines the first piece and the second piece of image data by use of the selection data. Specifically, the combining process is carried out pixel by pixel while selecting the pixel of the first piece or the second piece of image data that is specified by a value of the selection data. For example, when the value of the selection data is "0", the pixel of the first piece of image data is selected, and when it is "1", the pixel of the second image data is selected. Alternatively, the selection data consists of a plural number of bits, and a more complicated operation, e.g., Boolean operation or arithmetic operation, is used.

In a step S107, the image data combined by the combining portion 7 is sent to the output device 9 which in turn outputs an image in a visual manner.

As described above, even if the image structure of the input image is different from that of the output device, the image processing apparatus of the first embodiment converts the image structure of the input image data to that of the output device. Therefore, the output device produces an image of high quality.

<Second Embodiment>

Figure 7:
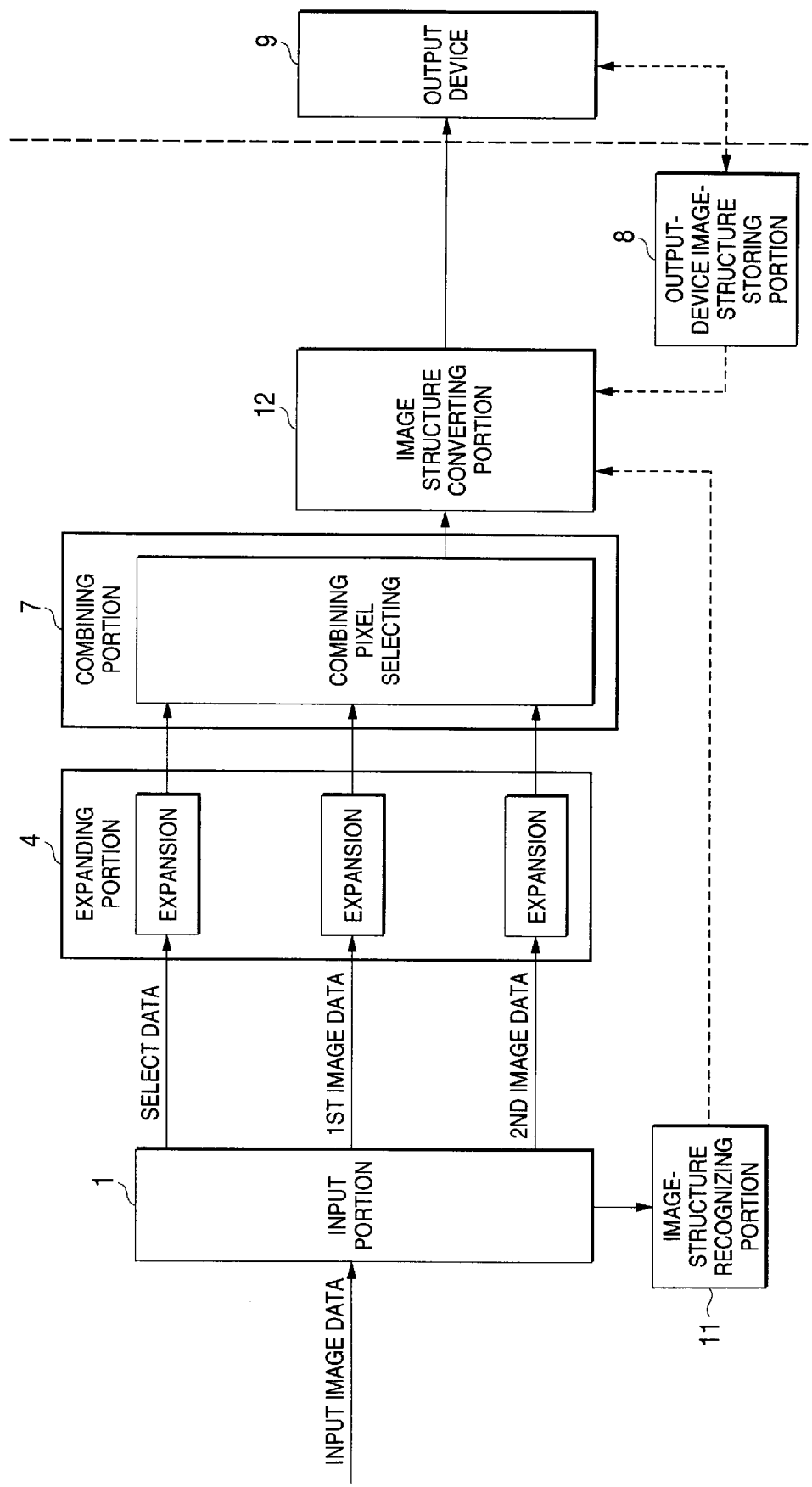
FIG. 7 is a block diagram showing an image processing apparatus which is a second embodiment of the present invention.

FIG. 7 is a block diagram showing an image processing apparatus which is a second embodiment of the present invention. In the figure, like or equivalent portions are designated by like reference numerals in FIG. 1 showing the first embodiment, and reference numeral 11 is an image-structure recognizing portion, and 12 is an image-structure converting portion. In the image processing apparatus of the second embodiment, the first piece of image data has the same image structure as of the second piece of image data. The image processing apparatus combines the first piece and the second piece of image data on a basis of the selection data, and converts the image structure of the combined image data to the image structure of the output device.

The image-structure recognizing portion 11 recognizes the image structure, which is commonly used for the first piece and the second piece of image data. To recognize the image structure, the image-structure recognizing portion 11 refers to the header attached to the image data. If the data structure is not contained in the header, preset information may be used for the image structure. The image-structure recognizing portion 11 may be configured as shown in FIG. 4.

The image-structure converting portion 12 converts the image structure of the combined image data to the image structure of the output device 9, which is obtained from the output-device image-structure storing portion 8, on the basis of the recognition result produced from the image-structure recognizing portion 11. The image-structure converting portion 12 may be configured as shown in FIG. 5.

Figure 8:
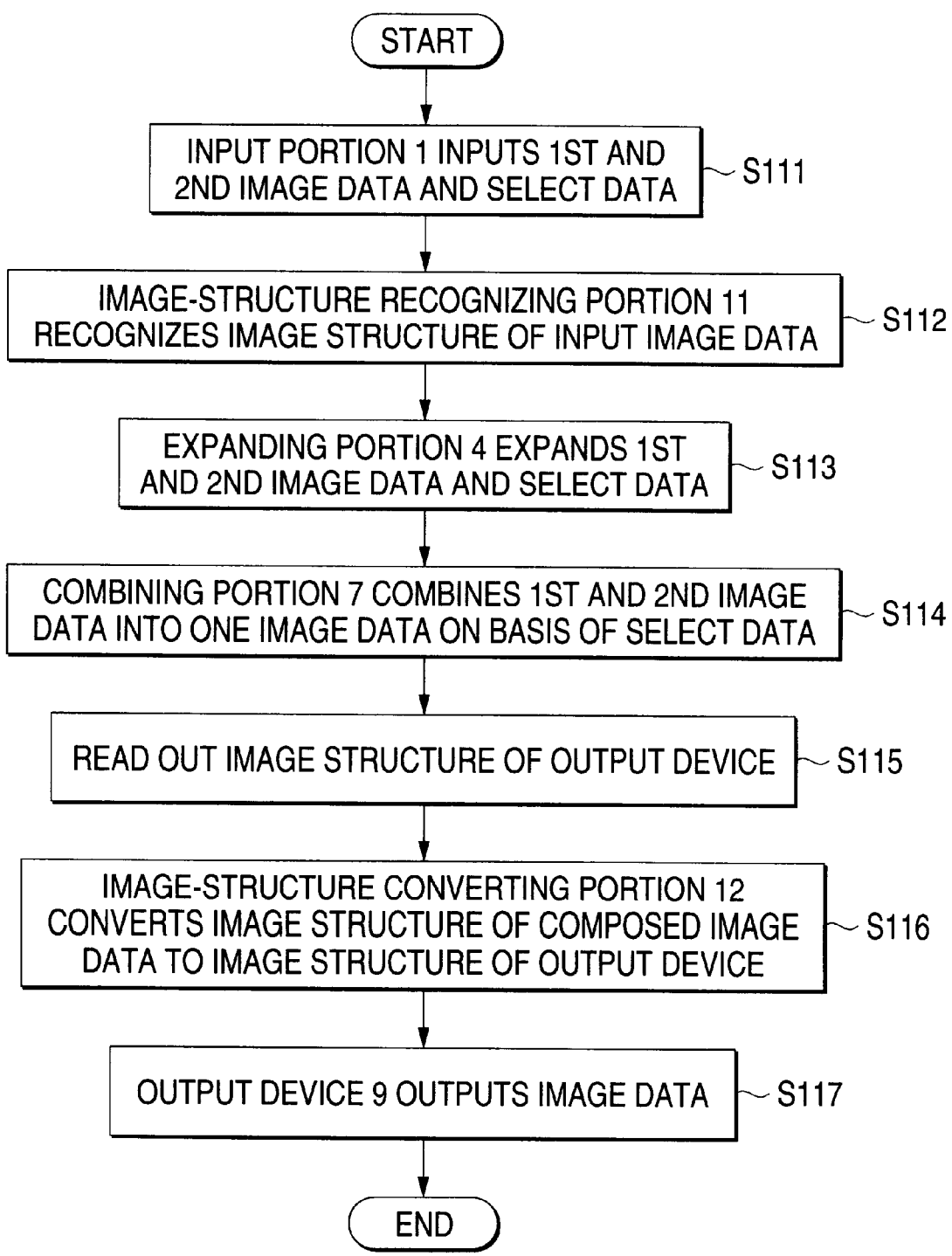
FIG. 8 is a flow chart showing an operation of the image processing apparatus of the second embodiment.

FIG. 8 is a flow chart showing an operation of the image processing apparatus thus constructed. A step S111 is first executed: a first piece and a second piece of image data and selection data are input to the input portion 1. A step S112 is executed: the image-structure recognizing portion 11 recognizes a color space and the number of gradation levels of the input image data, which specify the image structure. Where the header attached to the input image data contains a color space and gradation levels to specify the image structure, the image structure is extracted from the header. Where such information is not contained in the header or the header is not used, a preset value may be used for the recognition of the image structure. If the image-structure recognizing portion 11 is configured as shown in FIG. 4, the header-information extracting portion 21 extracts the header from the input image data; the color-space recognizing portion 22 recognizes a color space of the input image data; and the gradation-level recognizing portion 23 recognizes the number of gradation levels. The results of the recognition are output to the image-structure converting portion 12.

Next, a step S113 is executed: if the input image data is compressed, the expanding portion 4 expands the first piece and the second piece of image data and the selection data. A step S114 is executed: the combining portion 7 combines the first piece and the second piece of image data by use of the selection data. Specifically, the combining process is carried out pixel by pixel, and the value of the selection data specifies the first piece or the second piece of image data to which the pixels to be processed belong.

A step S115 is executed: the image-structure converting portion 12 reads out the image structure of the output device 9 from the output-device image-structure storing portion 8. A step S116 is executed: the image-structure converting portion 12 converts the color space and gradation level of the image structure of the combined image data to those of the image structure of the output device 9, which are read out of the output-device image-structure storing portion 8. The color space of the combined image data is converted to the RGB color space for the display device as the output device, and the CMYK or CMY color space for the printer. The number of gradation levels of the combined image data is converted to that of the output device 9. The color space converting method and the gradation level converting method, which were employed by and referred to in the first embodiment, are available for the image processing apparatus under discussion. A step S117 is finally executed: the image data with the converted image structure is output to the output device 9, which in turn produces an image visually.

As seen from the foregoing description, the image processing apparatus of the second embodiment carries out the image-structure converting process of only the combined image data. Therefore, the storage devices and converting devices, which are required, are reduced in number and hence the image processing apparatus is simplified in its configuration.

<Third Embodiment>

Figure 9:
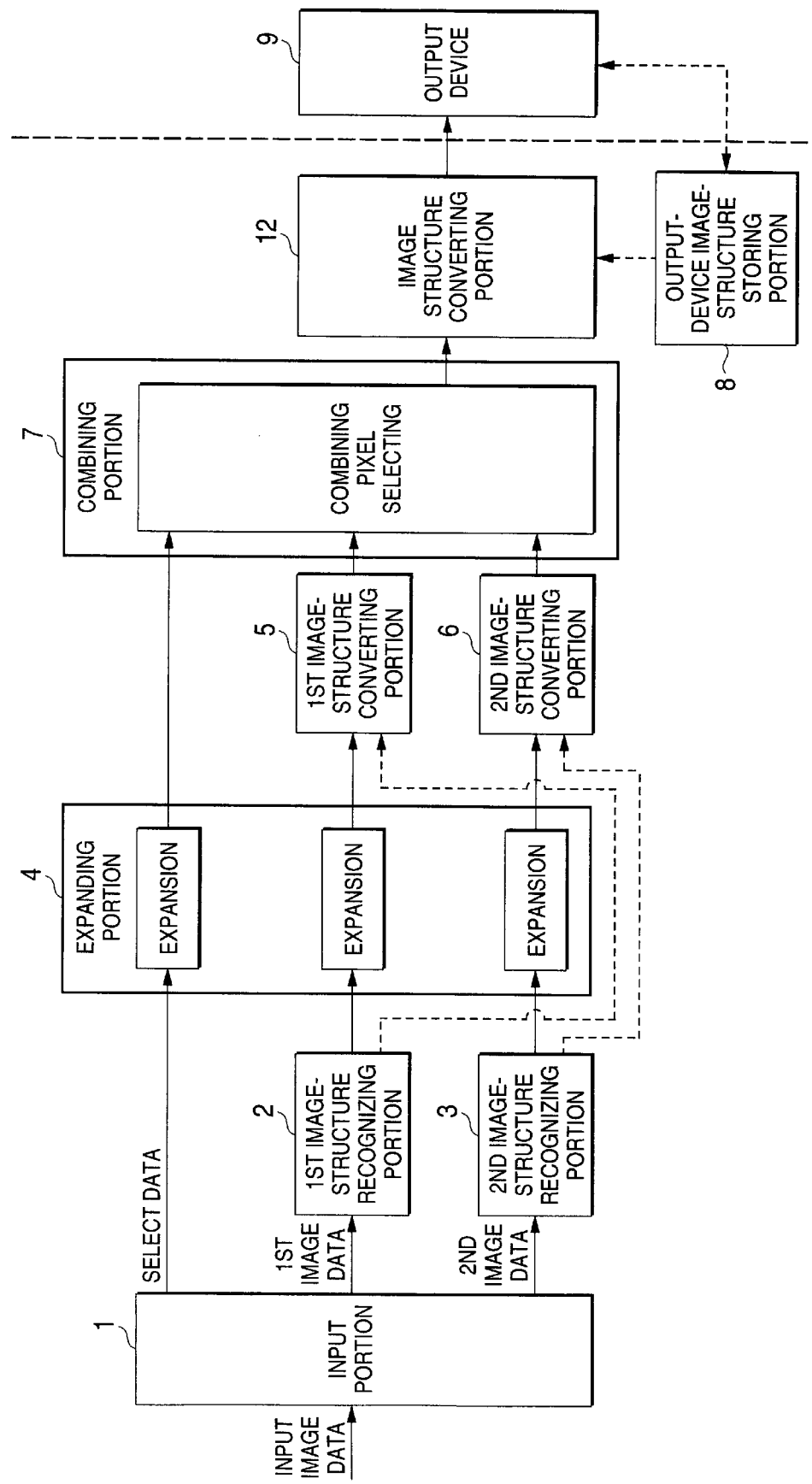
FIG. 9 is a block diagram showing an image processing apparatus which is a third embodiment of the present invention.

FIG. 9 is a block diagram showing an image processing apparatus which is a third embodiment of the present invention. In the figure, like or equivalent portions are designated by like reference numerals in FIGS. 1 and 7 showing the first and second embodiments. The image processing apparatus of the present embodiment converts the image structures of the first piece and the second piece of image data to another image structure; combines the first piece and the second piece of image data on a basis of the selection data; and converts the image structure of the combined image data to the image structure of the output device.

The first image-structure converting portion 5 converts the image structure of the first piece of image data to a predetermined or second image structure. The second image-structure converting portion 6 converts the image structure of the second image data to the second image structure. The first piece and the second piece of image data, after underwent the image-structure process, have each the second image structure. The second image structure may be the image structure of the first piece or the second piece of image data, or another image structure constructed on the basis of the image structures of the first piece and the second piece of image data. The first and image-structure converting portions 5 and 6 may be configured as shown in FIG. 5. The first and the second image-structure recognizing portions 2 and 3 may be configured as shown in FIG. 4.

The image-structure converting portion 12 converts the second image structure of the combined image data to the image structure of the output device 9, which is read out of the output-device image-structure storing portion 8. Where the second image structure of the image data resulting from the combining process is determined on the image structures of the first piece and the second piece of image data in the first and the second image-structure converting portions 5 and 6, the second image structure is obtained from the first or the second image-structure converting portion 5 or 6 and then is converted to the image structure of the output device 9.

Figure 10:
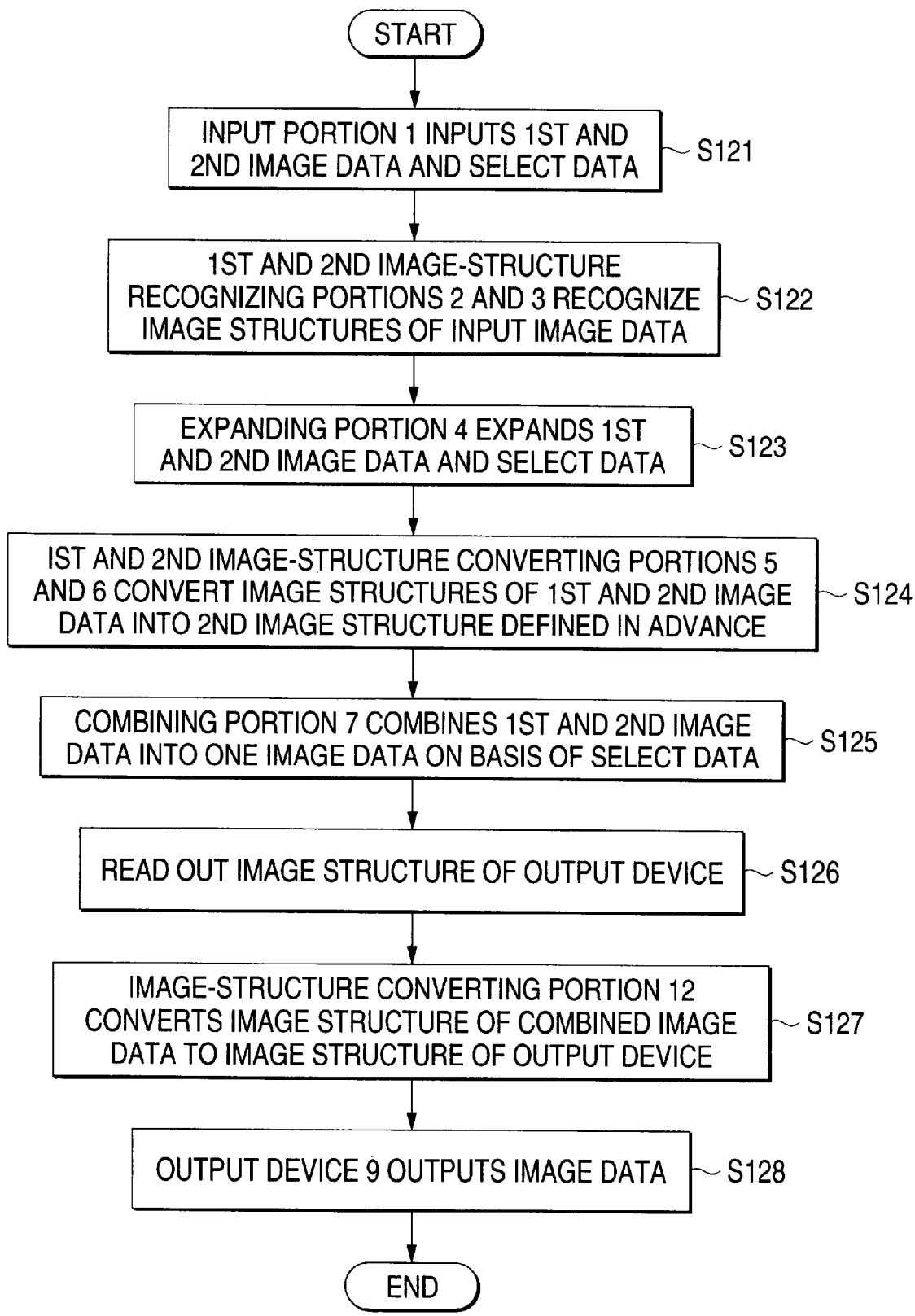
FIG. 10 is a flow chart showing an operation of the image processing apparatus of the third embodiment.

FIG. 10 shows a flow chart of an operation of the thus constructed image processing apparatus of the third embodiment. To start with, a step S121 is executed: the input portion 1 receives the first piece and the second piece of image data and the selection data. A step S122 is executed: the first and the second image-structure recognizing portions 2 and 3 recognize the image structures of the first piece and the second piece of image data received. Where the header attached to the input image data contains a color space and gradation levels to specify the image structure, the image structure is extracted from the header. Where such information is not contained in the header or the header is not used, a preset value may be used for the recognition of the image structure. If the first and the second image-structure recognizing portions 2 and 3 are configured as shown in FIG. 4, the header-information extracting portion 21 extracts the header from the input image data; the color-space recognizing portion 22 recognizes a color space of the input image data; and the gradation-level recognizing portion 23 recognizes the number of gradation levels. The results of the recognition output from the first image-structure recognizing portion 2 are output to the first image-structure converting portion 5, while the recognition results output from the second image-structure recognizing portion 3 are output to the second image-structure converting portion 6.

A step S123 is executed: if the input image data is compressed, the expanding portion 4 expands the first piece and the second piece of image data and the selection data.

A step S124 is executed: the first and the second image-structure converting portions 5 and 6 converts the image structures of the first piece and the second piece of image data into a second image structure which is defined in advance. In an example of the second image structure, a color space is an L*a*b* space, and the number of gradation levels is 256; L* ranges 0 to 100, and a*, b* range each –128 to 127. The second image structure may be the same as of the first piece of image data or the second piece of image data, or another image structure constructed on the basis of the image structures of the first piece and the second piece of image data.

A step S125 is executed: the combining portion 7 combines the first piece and the second piece of image data by use of the selection data. Specifically, the combining process is carried out pixel by pixel while selecting the pixels of the first piece or the second piece of image data that are specified by the values of the selection data.

A step S126 is executed: the image-structure converting portion 12 reads out the image structure of the output device 9 from the output-device image-structure storing portion 8. A step S127 is executed: the image-structure converting portion 12 converts the image structure of the combined image data to the image structure of the output device 9, which is read out of the output-device image-structure storing portion 8. The color space of the combined image data is converted to the RGB color space for the display device as the output device, and the CMYK or CMY color space for the printer. The number of gradation levels is converted to the number of gradation levels at which the output device 9 can produce the image data. Where the second image structure of the image data resulting from the combining process is determined on the image structures of the first piece and the second piece of image data in the first and the second image-structure converting portions 5 and 6, the second image structure is obtained from the first or the second image-structure converting portion 5 or 6 and then is converted to the image structure of the output device 9. A step S128 is finally executed: the image data with the converted image structure is output to the output device 9, which in turn produces an image visually.

The color space converting method and the gradation level converting method, which were employed by and referred to in the first embodiment, may be used by the first and the second image-structure converting portions 5 and 6, and the image-structure converting portion 12 in the image processing apparatus of the third embodiment.

In the image processing apparatus of the second embodiment, the image-structure conversion of the image data is carried out two times before and after the combining of the image data. Therefore, it is possible to select the image structure suitable for the image combining. Where a plural number of output devices 9 are used, the image-structure converting portion 12 need only to be increased in number correspondingly. In this respect, the versatility of the image processing apparatus is good.

<Fourth Embodiment>

Figure 11:
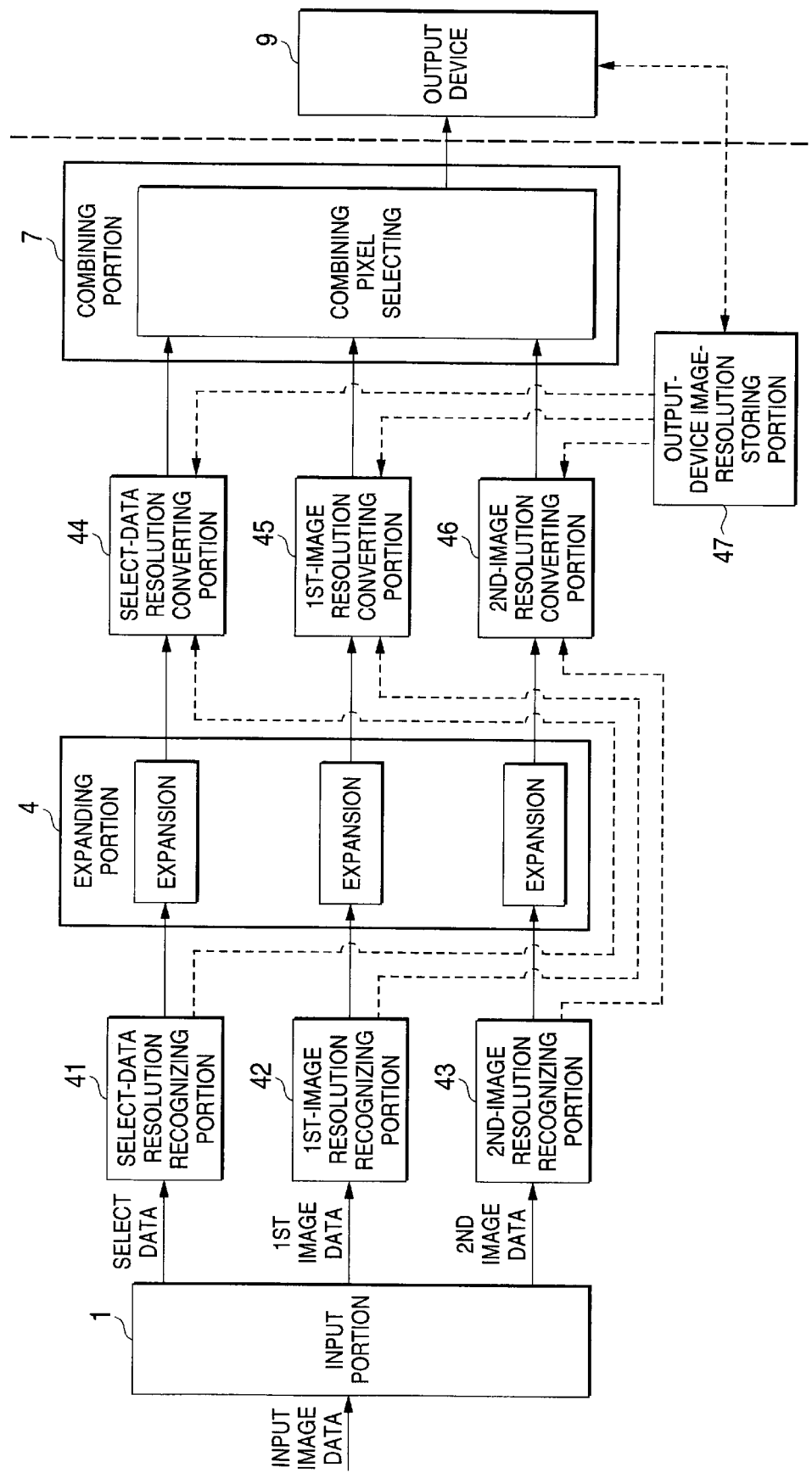
FIG. 11 is a block diagram showing an image processing apparatus which is a fourth embodiment of the present invention.

FIG. 11 is a block diagram showing an image processing apparatus which is a fourth embodiment of the present invention. In the figure, like or equivalent portions are designated by like reference numerals in FIG. 1 showing the first embodiment. In the figure, reference numeral 41 is a select-data resolution recognizing portion; 42 is a first-image resolution recognizing portion; 43 is a second-image resolution recognizing portion; 44 is a select-data resolution converting portion; 45 is a first-image resolution converting portion; 46 is a second-image resolution converting portion; and 47 is an output-device resolution storing portion. The image processing apparatus of the fourth embodiment converts the resolution of each input image data, which is one of the factors defining an image structure of the image data, to the resolution of the output device; combines the input image data of the converted resolution on a basis of the selection data; and outputs the combined image data in a visual manner. The selection data selectively specifies one of the first piece and the second piece of image data, and is binary data. Therefore, the selection data is nonsense for the conversion of the color space and the number of gradation levels as other factors of the image structure. However, there is a case where the resolution of the selection data needs to be converted. In the fourth embodiment, the selection data is subjected to the image-structure conversion process. The illustrated configuration of the image processing apparatus is based on the configuration of the first embodiment, but the apparatus may be configured on the basis of the second or third embodiment apparatus.

The select-data resolution recognizing portion 41 recognizes a resolution of the selection data. The first-image resolution recognizing portion 42 recognizes a resolution of the first piece of image data. The second-image resolution recognizing portion 43 recognizes a resolution of the second image data.

The select-data resolution converting portion 44 converts the resolution of the selection data recognized by the select-data resolution recognizing portion 41 to a resolution of the output device 9, which is stored in the output-device resolution storing portion 47. The first-image resolution converting portion 45 converts the resolution of the first piece of image data to the resolution of the output device 9, which is stored in the output-device resolution storing portion 47. The second-image resolution converting portion 46 converts the resolution of the second image data to the resolution of the output device 9, which is stored in the output-device resolution storing portion 47.

The resolution conversion methods used for the select data resolution converting portion 44 and the first- and second-image resolution converting portions 45 and 46 may properly selected from among known conversion methods in accordance with the data characteristics. Examples of the resolution conversion methods adaptable for high speed processing are a zero-order hold method and a nearest-neighbor method. FIG. 5 is a diagram for explaining the zero-order hold method. As shown, this method is an algorithm in which an output pixel P is replaced with an input pixel located preceding to the output pixel. When one of those methods is used for the resolution conversion, the resultant image is not satisfactory in image quality. A 4-point interpolation method, for example, is usually used as the resolution conversion method providing satisfactory image quality and processing speed. A projection method, a 16-point interpolation method, a logic operation method and others take each a relatively long processing time but provides a quality image. The logic conversion method may be enumerated for the resolution conversion method effective for the conversion of a resolution of the line drawing taking the form of binary data. From those resolution conversion methods, one may select proper resolution conversion methods for the select-data resolution converting portion 44, the first-image resolution converting portion 45 and the second-image resolution converting portion 46 may be selected from among those known resolution conversion methods. The same resolution conversion method may be used commonly for those resolution conversion methods, as a matter of course. The resolution conversion methods for those resolution converting portions may properly be selected from among those known resolution conversion methods in accordance with the type of input image data and the characteristic of the output device.

If the resolution recognized by the select-data resolution recognizing portion 41 is substantially the same as the resolution of the output device 9, there is no need of the resolution conversion by the select-data resolution converting portion 44. The same thing is true for the combination of the first-image resolution recognizing portion 42 and the first-image resolution converting portion 45, and the combination of the second-image resolution recognizing portion 43 and the second-image resolution converting portion 46.

The output-device resolution storing portion 47 stores the resolution of the output device 9. The resolution of the output device may be set in advance, entered by the user at the time of outputting the image data, or obtained by inquiring it of the output device 9.

Figure 12:
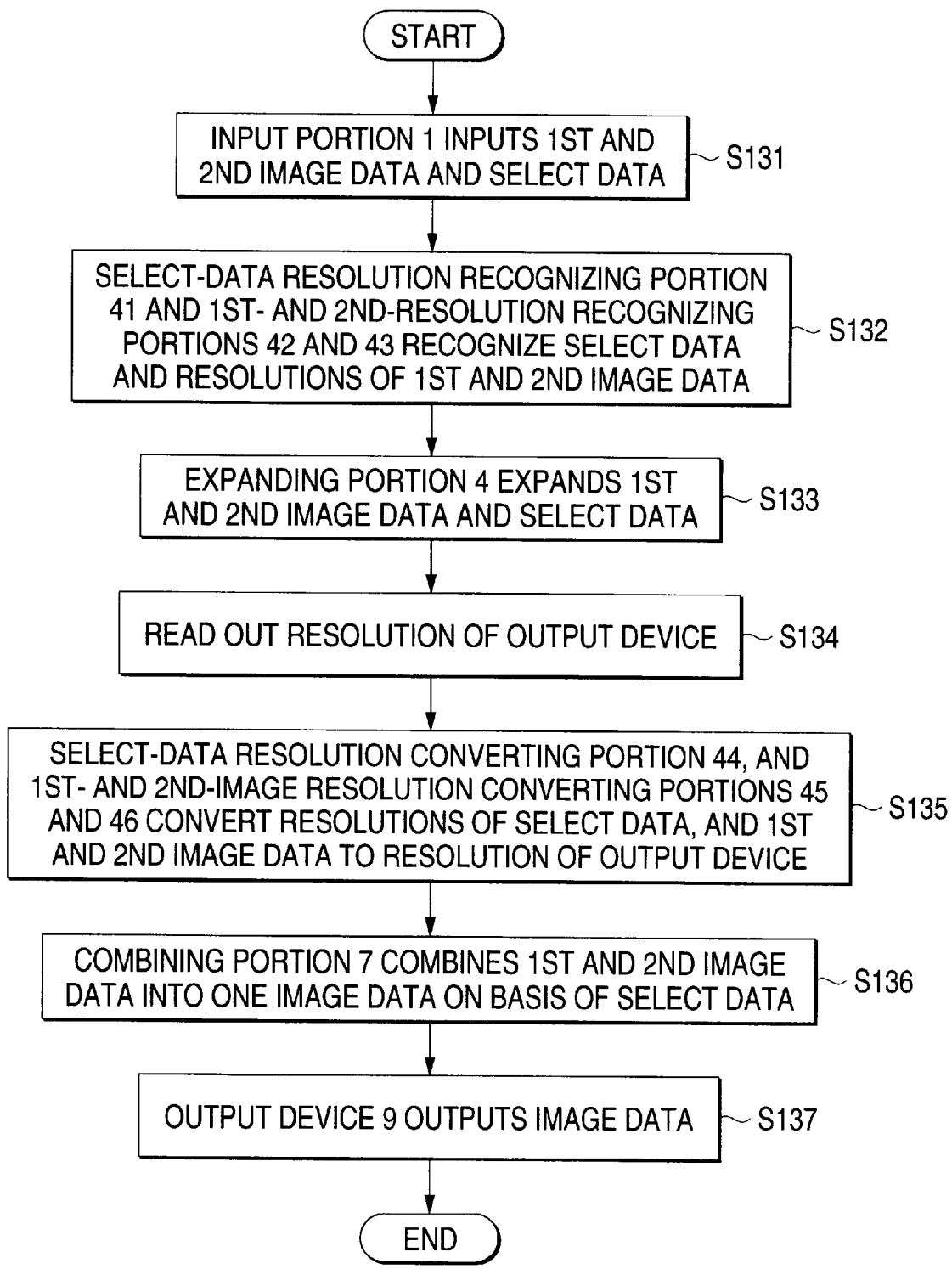
FIG. 12 is a flow chart showing an operation of the image processing apparatus of the fourth embodiment.

FIG. 12 shows a flow chart of an operation of the thus constructed image processing apparatus of the fourth embodiment. To start with, a step S131 is executed: the input portion 1 receives the first piece and the second piece of image data and the selection data. A step S132 is executed: the select-data resolution recognizing portion 41 and the first- and the second-image resolution recognizing portions 42 and 43 recognize the resolutions of the first piece and the second piece of image data and the selection data. Where the header attached to the input image data contains information to specify the resolution, the resolution is extracted from the header. Where such information is not contained in the header or the header is not used, a preset value may be used for the recognition of the resolution. The recognition result output from the select-data resolution recognizing portion 41 is sent to the select-data resolution converting portion 44; the recognition results from the first-image resolution recognizing portion 42, to the first-image resolution converting portion 45; and the recognition result from the second-image resolution recognizing portion 43, to the second-image resolution converting portion 46.

A step S133 is executed: if the input image data is compressed, the expanding portion 4 expands the first piece and the second piece of image data and the selection data.

A step S134 is executed: the select-data resolution converting portion 44, the first-image resolution converting portion 45 and the second-image resolution converting portion 46 read out the resolution of the output device 9 from the output-device resolution storing portion 47. A step S135 is executed: the select-data resolution converting portion 44, and the first- and the second-image resolution converting portions 45 and 46 convert the resolutions, which are recognized by the select-data resolution recognizing portion 41 and the first- and the second-image resolution recognizing portions 42 and 43, to the resolution of the output device 9, which is read out of the output-device resolution storing portion 47.

A step S136 is executed: the combining portion 7 combines the first piece of image data whose resolution was converted by first-image resolution converting portion 45, and the second image data whose resolution was converted by the second-image resolution converting portion 46, by use of the selection data whose resolution was converted by the select-data resolution converting portion 44. The combining process is carried out pixel by pixel at the resolution of the output device 9 while selecting the pixel of the first piece or the second piece of image data in accordance with the value of the selection data. A final step S137 is executed: the combined image data is output to the output device 9, which in turn produces an image visually.

As described above, even if the resolutions of the input image data and the selection data are different from the resolution of the output device 9, the image processing apparatus of the fourth embodiment can produce the image data at the resolution of the output device 9. In the fourth embodiment, only the resolution of the image structure is converted; however, other factors of the image structure may also be converted in similar ways when the fourth embodiment is combined with the first to third embodiments.

The image processing apparatuses of the respective embodiments of the invention are arranged so as to carry out the image-structure conversion process of the input image data. If required, the image processing apparatus may be arranged so as to carry out various processes that are applied to the output device 9 depending on its type, e.g., digital screen, analog screen, sharpness correction, and gamma correction, in addition to the image-structure conversion process. Those processes may be applied to the selection data and the first piece and the second piece of image data at a proper location between the expansion stage of the input image and the combining stage or after the combining process.

In the first, third and fourth embodiments, the first image-structure recognizing portion 2, second image-structure recognizing portion 3, select-data resolution recognizing portion 41, and first- and second-image resolution recognizing portions 42 and 43 are located between the input portion 1 and the expanding portion 4. If required, those recognizing portions may be arranged in parallel with the expanding portion 4 as in the second embodiment.

Figure 13:
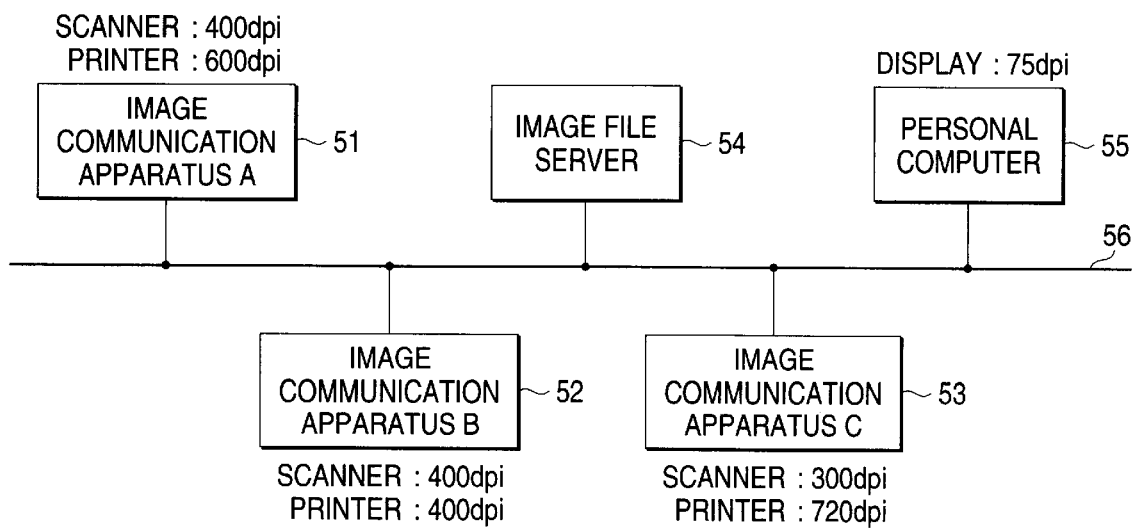
FIG. 13 is a block diagram showing a network system including the image processing apparatus constructed according to the present invention.
Figure 14:
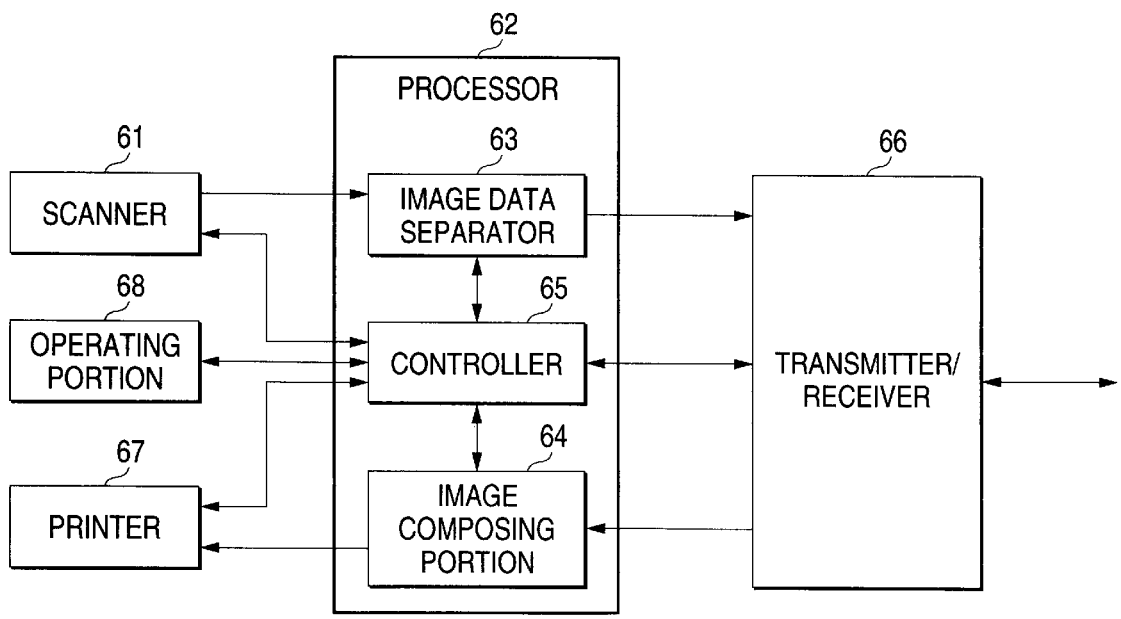
FIG. 14 is a block diagram showing an image communication apparatus.

Some applications of the above-mentioned embodiments of the present invention will be described. An image data communication through a network will first be described. FIG. 13 is a block diagram showing a network system including the image processing apparatus constructed according to the present invention. FIG. 14 is a block diagram showing an image communication apparatus. In the figures, reference numerals 51 to 53 are image communication apparatuses; 54 is a filer server; 55 is a personal computer; 56 is a network; 61 is a scanner; 62 is a processor; 63 is an image data separator; 64 is an image combining portion; 65 is a controller; 66 is a transmitter/receiver; 67 is a printer; 68 is an operating portion. In the network system of FIG. 13, three image communication apparatuses 51 to 53 each having an image input device and an image output device, the filer server 54 for storing a plural number of input image data, and the personal computer (PC) 55 with a display device are interconnected through the network 56. Various devices may additionally be connected to the network 56. Further, the network 56 may be connected to other devices and networks by way of a public line.

Each image communication apparatus reads out image data from an original by the scanner and outputs the image data. In this case, the image data takes any of the image data formats shown in FIGS. 3A to 3C. The image structure of the image data is determined in the transmission side for its reasons. The reception side receives the image data from the transmission side; checks the image structures of three data of the image data, which are described in the header attached to the image data; converts the image structures of the respective data so as to allow the combining process of those image data into an original image; combines the data into the original image; converts again the image structure of the combination image data to the image structure of the printer; and outputs the image data to the printer.

The image communication apparatuses 51 to 53 are each configured as shown in FIG. 14. As shown, the image processing apparatus includes the scanner 61, processor 62, transmitter/receiver 66, printer 67 and the operating portion 68. The scanner 61 reads out image data from an original. The processor 62 includes the image data separator 63, the image combining portion 64, and the controller 65. The image data separator 63 separates the image data read out of the original into three data, first piece and second piece of image data and selection data, and compresses these data. The image combining portion 64 combines three data received through the transmitter/receiver 66 into the original image data, and outputs the original image data to the printer 67. The controller 65 controls the operations of the related functional portions, and sets process parameters. The transmitter/receiver 66 sends the image data to other image communication apparatus or apparatuses, the filer server 54, the personal computer 55, and the like, by way of the network 56, and receives the image data from those apparatus and devices by the same route. The printer 67 prints the reconstructed image data on a printing medium. The operating portion 68 is a user interface through which the user interactively operates the image communication apparatus.

Any of the image processing apparatuses of the first to fourth embodiments of the invention is incorporated into the image combining portion 64 and the controller 65 of each of the image communication apparatuses 51 to 53. The image processing apparatus of the invention may be incorporated into the personal computer 55. In this case, it is incorporated into the functional portion where the received image data is output to the display device. In this instance, the printer 67 corresponds to the output device 9 of each embodiment.

In the network system of FIG. 13, the resolutions of the image communication apparatuses 51 to 53 and the personal computer 55, which are connected to the network, are different from the resolutions of the input and output devices, i.e., the scanner, the printer and the display device. The RGB color space is used for the color spaces of the scanner and the display device, and the YMC or YMCK color space is used for the printer. Other factors of the image structures are sometimes different among those devices. The image data is transmitted through the network 56. An efficient data transmission is desirable for reduction of communication cost. To this end, the amount of data to be transmitted is reduced through conversion processes in the transmission side. In this case, care must be taken so as to avoid an excessive deterioration of the image quality. To this end, as shown in FIG. 2, the image data is separated into a plural number of data, and each data is appropriately processed, whereby a good compromise between the reduction of data amount and the deterioration of the image quality is secured.

The image data that is read out of an original by the scanner of each of the image communication apparatuses 51 to 53 is separated into a plural number of data as shown in FIG. 2, and transmitted in any of the image data formats shown in FIGS. 3A to 3C through the network 56. The image structure of each data is determined in the transmission side for its reasons. The reception side needs to correctly combine the received image data having the different image structures and to output the resultant data. To this end, the image processing apparatus of the present invention may be used. Specifically, the reception side incorporating the image processing apparatus checks the image structures of the respective data while referring to the header, for example; converts the various factors defining the image structures, for example, the resolutions of the data, the color spaces and the number of gradation levels of the first piece and the second piece of image data to an image structure which allows the related functional block in the reception side to correctly combine the respective data, i.e., the first piece and the second piece of image data; and combines those data having the converted image structure. In this way, the reception side can correctly combine the image data output from any of the image communication apparatuses 51 to 53. Thereafter, the reception side carries out an appropriate conversion process of the image data to produce image data that can be handled by the output device, e.g., printer and display, for its outputting operation. The output device receives the thus processed image data and reproduces the original image or picture of high quality.

The network system of FIGS. 3A to 3C incorporating the present invention is one of many applications of the present invention. Another application of the invention is a communication system in which communication is set up between apparatuses connected to each other in one-to-one correspondence, the system being not the system based on the public line or the network. The invention is applicable to a single computer coupled with a disc device of large memory capacity. In this case, the image processing apparatus is applied to a process to read out separated data from the disc device.

Figure 15:
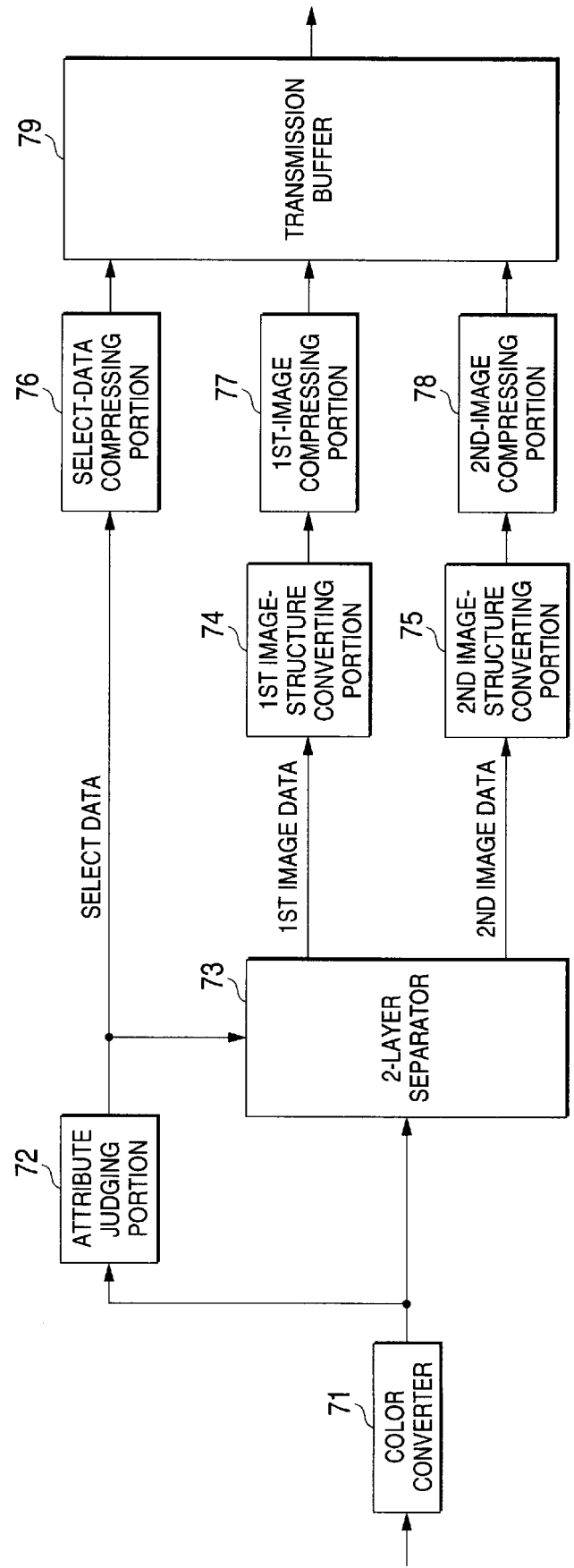
FIG. 15 is a block diagram showing a specific example of an image data separator.

Finally, a specific example of the operating portion 68 for separating the image data into three data as shown in FIG. 2 will be described. FIG. 15 is a block diagram showing a specific example of the image data separator. In the figure, reference numeral 71 is a color converter; 72 is an attribute judging portion; 73 is a 2-layer separator; 74 is a first image-structure converting portion; 75 is a second image-structure converting portion; 76 is a select-data compressing portion; 77 is a first-image compressing portion; 78 is a second-image compressing portion; and 79 is a transmission buffer.

The color converter 71 is provided for converting a color space of the image data output from the scanner 61. The RGB color space of the scanner 61 is converted to, for example, a CIELAB color space as a common color space by the color converter 71. The attribute judging portion 72 judges the attribute of the image for each pixel or every several pixels of the image data having undergone the color space conversion or for each image region of the image data, and outputs the judging result in the form of selection data. For example, the attribute judging portion 72 judges the image data every pixel if it is a character region or a pictorial region including photograph. The 2-layer separator 73 separates the color converted image data into two layers, i.e., the first piece of image data and the second piece of image data.

The first image-structure converting portion 74 converts the image structure of the first piece of image data. The second image-structure converting portion 75 converts the image structure of the second image data.

The select-data compressing portion 76 compresses the selection data. In this instance, the select-data compressing portion 76 is binary data indicative of the first piece of image data or the second image data to which the image data is converted. Any of the data compression methods, e.g., run-length, MH, MR, MMR, and arithmetic coding, may be used for the select-data compressing portion 76. The first-image compressing portion 77 compresses the first piece of image data. The second-image compressing portion 78 compresses the second image data. A data compression method suitable for the compression of color image, e.g., JPEG base line method, is used for both the data compressing portions. Also when the JPEG base line method is used, the quantitizing table may be different for each data.

The transmission buffer 79 temporarily stores the compressed data output from the select-data compressing portion 76, and the first- and second-image compressing portions 77 and 78. At this time, information about the image structures of the compressed data or other information are added in the form of a header to the compressed image data, so that the data are arranged into an image data format as shown in FIGS. 3A to 3C.

The image data separator 63 thus far described is presented by one of example, and it may take any other suitable configuration. The selection data may also be processed for its image structure conversion.

An operation of the image data separator 63 will be described. To start with, a user sets up an operation mode in the image data separator 63 through his operation on the operating portion 68, for example. The operation modes are a quality image mode, a normal mode, and a high compression ratio mode. The user designates the image quality or communication time reduction which is given top when the image data separator 63 operates, by properly choosing one of those modes. In other words, an image-structure conversion process or a data compression process is selected by the user's choosing of the operation mode. A resolution conversion ratio is set at "1" in the quality image mode, and it is set at a value smaller than "1" in the high compression ratio mode. The resolution conversion method may properly be selected for the operation mode to be set up. The same thing is correspondingly applied to the other factors of the image structure, e.g., the color space and the number of gradation levels.

Following the mode designation, an original document is located on the scanner 61, and image data thereon is read out. The image data thus read out is input to the color converter 71 where the RBG color space as a color system of the scanner 61 is converted to the CIELAB color space to be used in the processings in the apparatus. The image data of the CIELAB is input to the attribute judging portion 72 and the 2-layer separator 73.

The attribute judging portion 72 judges the attribute of the image data, for example, as to whether or not the pixel is in the character region or the pictorial region. The judging result is output in the form of selection data. For example, the selection data of (B) of FIG. 2 is obtained from the image data of (A) of FIG. 2. The selection data is input to the 2-layer separator 73 and the select-data compressing portion 76. The select-data compressing portion 76 compresses the selection data by a given compression method and stores the resultant data into the transmission buffer 79.

The 2-layer separator 73 separates the image data into the first piece of image data and the second piece of image data in accordance with the selection data received from the attribute judging portion 72, and outputs those data in parallel. In a specific example, the 2-layer separator 73 separates the image data of (A) of FIG. 2 into the first piece of image data ((C) of FIG. 2) and the second piece of image data ((D) of FIG. 2).

The first image-structure converting portion 74 receives the first piece of image data from the 2-layer separator 73 and converts the image structure of the image data. The first piece of image data after being converted is input to the first-image compressing portion 77 where it is compressed by a suitable data compressing method, e.g., a JPEG method, and then the resultant is stored into the transmission buffer 79. Similarly, the second image data, which is output from the 2-layer separator 73, is input to the second image-structure converting portion 75 where its image structure is converted. The second image data thus converted is input to the second-image compressing portion 78 where its data amount is compressed by the JPEG method, for example, and stored into the transmission buffer 79.

The image data of one page that is received from the scanner 61 is separated into three data; those separated data are appropriately processed to produce the compressed data; and the compressed data is loaded into the transmission buffer 79. Thereafter, the controller 65 arranges the compressed data into any of the image data formats as shown in FIGS. 3A to 3C. In formatting the compressed data, image-structure information, e.g., the color space, the number of gradation levels, and the resolution, are added to the compressed data.

After formatting the image data, the controller 65 drives the transmitter/receiver 66 which in turn starts the transmission of the image data stored in the transmission buffer 79. In this case, the transmitter/receiver 66 sets up its connection to the network 56 according to a predetermined protocol, and then sends the data formatted as mentioned above. Thus, the separated and compressed image data is sent to another image communication apparatus, the filer server 54 and the personal computer 55, and the like. In this way, the image data is transmitted at high speed and with little deterioration of image quality.

The thus sent image data is received by another image communication apparatus, the filer server 54 and the personal computer 55, and the like. When the separated, compressed and formatted image data is received by the filer server 54, the image data is stored into the filer server 54 in a state that its image data format remains unchanged or after it is changed to another format. When the image data is received by another image communication apparatus or the personal computer 55 and is displayed on a monitor, the image data is processed for combining by the image processing apparatus constructed according to the invention. When another image communication apparatus receives the image data, its transmitter/receiver 66 sets up its connection to the network 56 according to a predetermined communication protocol, and then receives the image data. The received image data is input to the input portion 1 of the image combining portion 64. The image data, which is present in the input portion 1, has a image structure determined by its sender or image communication apparatus. The characteristic of the printer 67 connected to the image communication apparatus which has received the image data is also different from the corresponding one connected to the sender. In the image combining portion 64, the image processing apparatus constructed according to the invention converts the image structures of those separated image data to the image structure of the printer 67, and outputs the resultant to the printer 67. The printer 67 reproduces the original image of high quality.

As seen from the foregoing description, the image processing apparatus of the invention separates input image data into a first piece of image data, a second image data, and selection data to selectively designate one of the separated image data, accurately combines those separated data, and sends invention produces many advantages. The conversion process most suitable for each separated data is selected, so that the image quality is little deteriorated, and the amount of data is reduced. These facts allows a high speed data transmission, and save the memory capacity of the memory to store the image data, and enable the image data to be reproduced exactly and at high picture quality. Further, even if the input image data has any image structure, the image processing apparatus converts the image structure to that of the output device, and outputs the resultant to the output device. The output device reproduces the original image of high quality.

What is claimed is:

1. An image processing apparatus comprising:

input means to which at least a first piece of image data compressed using a first compression type, a second piece of image data compressed using a second compression type, and selection data to selectively specify the first piece or the second piece of image data are input;

image-structure converting means for converting the image structures of the first piece and the second piece of image data received from said input means to an image structure of an output device; and combining means for combining the first piece and the second piece of image data having the same image structure as of said output device on a basis of the selection data, wherein the image structure to be converted by said image-structure converting means is defined by a color space, and said combining means combines the first piece and the second piece of image data having the same color space as of said .output device on a basis of the selection data.

2. The image processing apparatus of claim 1, wherein the image structure to be converted by said image-structure converting means is defined by the number of gradation levels, and said combining means combines the first piece and the second piece of image data having the same number of gradation levels as of said output device on a basis of the selection data.

3. An image processing apparatus comprising:

input means to which at least a first piece of image data compressed using a first compression type, a second piece of image data compressed using a second compression type having the same image structure as of the first piece of image data, and the selection data to selectively specify either of the first piece and the second piece of image data are input;

combining and decompressing means for combining the first piece and the second piece of image data received from said input means on a basis of said selection data; and image-structure converting means for converting the image structure of the combined image data received from said combining means to the image structure of an output device, wherein the image structure to be converted by said image-structure converting means is defined by a color space, and said image-structure converting means converts a color space of the combined image data received from said combining means to another color space of said output device for outputting said combined image data.

4. The image processing apparatus of claim 3, wherein the image structure to be converted by said image-structure converting means is defined by the number of gradation levels, and said image-structure converting means converts the number of gradation levels of the combined image data received from said combining means to the number of gradation levels of said output device for outputting said combined image data.

5. An image processing apparatus comprising:

input means to which at least a first piece of image data compressed using a first compression type, a second piece of image data compressed using a second compression type, and selection data to selectively specify either of the first piece and the second piece of image data are input;

resolution recognizing means for recognizing the resolutions of the first piece and the second piece of image data and the selection data received from said input means;

resolution converting means for converting the resolutions of the first piece and the second piece of image data, and the selection data received from said input means, which are received from said resolution recognizing means, to a resolution of an output device; and combining means for combining the first piece and the second piece of image data received from said resolution converting means on a basis of the selection data.

6. An image processing apparatus comprising:

input means to which at least a first piece of image data compressed using a first compression type, a second piece of image data compressed using a second compression type, and selection data to selectively specify either of the first piece and the second piece of image data are input;

resolution recognizing means for recognizing the resolutions of the first piece and the second piece of image data and the selection data received from said input means;

resolution converting means operating such that when after the resolutions of the first piece and the second piece of image data and the selection data received from said input means are recognized by said resolution recognizing means, said resolution converting means converts the resolution of the data, which is different from the resolution of an output device, to the resolution of said output device; and combining means for combining the first piece and the second piece of image data received from said resolution converting means on a basis of the selection data.

7. An image processing apparatus comprising:

input device to which at least a first piece of image data compressed using a first compression type, a second piece of image data compressed using a second compression type, and selection data to selectively specify the first piece or the second piece of image data are input;

image-structure converting device for converting the image structures of the first piece and the second piece of image data received from said input device to an image structure of an output device; and combining device for combining the first piece and the second piece of image data having the same image structure as of said output device on a basis of the selection data, wherein the image structure to be converted by said image-structuring converting device is defined by a color space, and said combining device combines the first piece and the second piece of image data having the same color space as of said output device on a basis of the selection data.

8. The image processing apparatus of claim 7, wherein the image structure to be converted by said image-structuring converting device is defined by the number of gradation levels, and said combining device combines the first piece and the second piece of image data having the same number of gradation levels as of said output device on a basis of the selection data.

9. An image processing apparatus comprising:

input device to which at least a first piece of image data compressed using a first compression type, a second piece of image data compressed using a second compression type having the same image structure as of the first piece of image data, and the selection data to selectively specify either of the first piece and the second piece of image data are input;

combining and decompressing device for combining the first piece and the second piece of image data received from said input device on a basis of said selection data; and image-structure converting device for converting the image structure of the combined image data received from said combining device to the image structure of an output device, wherein the image structure to be converted by said image-structuring converting device is defined by a color space, and said image-structuring converting device converts a color space of the combined image data received from said combining device to another color space of said output device for outputting said combined image data.

10. The image processing apparatus of claim 9, wherein the image structure to be converted by said image-structuring converting device is defined by the number of gradation levels, and said image-structuring converting device converts the number of gradation levels of the combined image data received from said combining device to the number of gradation levels of said output device for outputting said combined image data.

11. An image processing apparatus comprising:

input device to which at least a first piece of image data compressed using a first compression type, a second piece of image data compressed using a second compression type, and selection data to selectively specify either of the first piece and the second piece of image data are input;

resolution recognizing device for recognizing the resolutions of the first piece and the second piece of image data and the selection data received from said input device;

resolution converting device for converting the resolutions of the first piece and the second piece of image data, and the selection data received from said input device, which are received from said resolution recognizing device, to a resolution of an output device; and combining device for combining the first piece and the second piece of image data received from said resolution converting device on a basis of the selection data.

12. An image processing apparatus comprising:

input device to which at least a first piece of image data compressed using a first compression type, a second piece of image data compressed using a second compression type, and selection data to selectively specify either of the first piece and the second piece of image data are input;

resolution recognizing device for recognizing the resolutions of the first piece and the second piece of image data and the selection data received from said input device;

resolution converting device operating such that when after the resolutions of the first piece and the second piece of image data and the selection data received from said input device are recognized by said resolution recognizing device, said resolution converting device converts the resolution of the data, which is different from the resolution of an output device, to the resolution of said output device; and combining device for combining the first piece and the second piece of image data received from said resolution converting device on a basis of the selection data.

* * * * *